(12) United States Patent
Yuhas

(10) Patent No.: US 6,945,367 B1
(45) Date of Patent: Sep. 20, 2005

(54) ROTOR AND EXCITER RING

(75) Inventor: David M. Yuhas, Granger, IN (US)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 10/709,695

(22) Filed: May 24, 2004

(51) Int. Cl.$^7$ ................................................. B60T 1/06
(52) U.S. Cl. ............................... 188/18 R; 188/218 R
(58) Field of Search ......................... 188/18 R, 218 R, 188/17, 18 A, 181 A, 218 XL, 71.5, 181 R

(56) References Cited

U.S. PATENT DOCUMENTS

| 3,626,226 | A |   | 12/1971 | Pauwels |
| 3,793,545 | A |   | 2/1974 | Leiber et al. |
| 5,067,597 | A |   | 11/1991 | Young |
| 5,129,741 | A | * | 7/1992 | Deane ........................ 384/448 |
| 5,263,900 | A | * | 11/1993 | Stimson .................. 188/181 R |
| 5,332,065 | A |   | 7/1994 | Steele et al. |
| 5,739,684 | A | * | 4/1998 | Burns ..................... 188/181 R |
| 5,984,422 | A |   | 11/1999 | Seifert |
| 6,212,981 | B1 |   | 4/2001 | Brinker et al. |
| 6,718,634 | B1 |   | 4/2004 | Sadanowicz et al. |

* cited by examiner

Primary Examiner—Melanie Torres
(74) Attorney, Agent, or Firm—Leo H. McCormick, Jr.; Warren Comstock

(57) ABSTRACT

A rotor assembly with a cylindrical body having a radial disc that is perpendicularly aligned with a hub of a vehicle and an exciter ring through which a sensor detects rotation of the radial disc. The exciter ring is concentrically installed within the cylindrical body to define a gap between a flange thereon and the radial disc. Reluctance sections on the flange are axially aligned with the sensor to generate a signal indicative of rotation. Friction members engage the radial disc and generate thermal energy that is conducted a mounting flange. Thermal energy level may cause the rotor assembly to expand and change the alignment of the radial disc from perpendicular and non-perpendicular with respect to the hub. The gap allows the radial disc and exciter ring to independently move such that the reluctance sections remain axially aligned with the sensor and sensed information is an accurate indication of rotation.

14 Claims, 4 Drawing Sheets

US 6,945,367 B1

ROTOR AND EXCITER RING

BACKGROUND OF INVENTION

This invention relates to a rotor that is mounted on a hub that is retained on an axle with an exciter ring attached to the rotor wherein the exciter ring remains substantially concentric to the axle whenever the rotor experiences thermal expansive changes resulting from a brake application such that information detected by a sensor regarding the rotative movement of the rotor is not effected by changes in a perpendicular relationship between the rotor and the hub.

It is common to provide a vehicle with an electronic control that includes means to detect rotation of the wheels. Information relating to the rotation of the wheels is most often used to effect a brake application of a wheel when information is sensed that may adversely effect the safety or operation of a vehicle. Some of the information is often obtained from an electronic device that detects movement of a rotor by sensing reluctance changes in an exciter ring attached to a hub, as illustrated in U.S. Pat. No. 3,793,545. A wheel for the vehicle is attached to the hub that is retained on an axle of the vehicle. This type structure functions in a satisfactory manner for most applications but in some vehicles the space for locating an exciter ring in the hub is limited and it was suggested the exciter ring could be relocated as an integral part of the rotor to detect rotative movement thereof as disclosed in U.S. Pat. Nos. 5,067,597 and 5,332,065. An integral exciter ring functions in an adequate manner under most operational conditions however under an extreme brake duty cycle during which friction members sequentially engage the rotor for a long period of time without a sufficient time to allow the rotor to cool between periods of engagement, the rotor will experience thermally expansion. This thermal expansion may cause a rotor to be skewed from a perpendicular to a non perpendicular alignment with the hub and effect the validity of some sensed information relating to the rotation of the rotor.

SUMMARY OF INVENTION

An advantage of the present invention resides in structure that allows for independent thermal expansion of the rotor and an exciter ring and as a result information obtained with respect to rotation of the rotor is not effected by the generation of thermal energy between the rotor and friction members.

According to this invention, a rotor assembly for a vehicle is mounted on a hub that is retained on an axle of a vehicle. The rotor assembly is distinguished by a radial disc that is offset from a mounting flange that is fixed to the hub by a cylindrical body and an exciter ring through which a sensor detects rotation of the radial disc with respect to the axle. The radial disc has a first surface that functions as a first friction face and a second surface that functions as a second friction face for first and second friction members. The first and second friction members respectively engage the first and second surfaces to attenuate the rotation of the radial disc during a brake application. The first and second friction members on engagement with the first and second friction faces generate thermal energy that is carried from the radial disc toward the mounting flange by way of the cylindrical body of the rotor. The radial disc reacts to a predetermined thermal energy level by being distorted from perpendicular alignment to non-perpendicular alignment with respect to the hub. The exciter ring is characterized by a cylindrical member having a first end that is concentrically located within the cylindrical body of the rotor to define a gap between a face on an outwardly extending flange on a second end thereof and the radial disc. The outwardly extending flange has a plurality of reluctance sections located thereon that are aligned with the sensor. The sensor reacts to movement of the reluctance sections to provide an electronic control unit with information relating to the rotation of the radial disc, The gap allows the radial disc to move independently with respect to the outwardly extending flange such that the plurality of reluctance sections remain aligned with the sensor whenever the radial disc changes from perpendicular to non-perpendicular alignment with respect to the hub.

An advantage of this invention resides in structure that allows a rotor disc to independently move in response to thermal expansive changes while an exciter ring remains in a desired alignment with respect to a sensor that provides an electronic control unit with information relating to the rotation of the rotor.

A further advantage of this invention resides in an attachment of a rotor with a hub whereby the retention of an exciter ring with respect to a rotor is not skewed by deflection of the rotor resulting from thermal expansion.

A still further advantage of this invention resides in an attachment arrangement for an exciter ring to a rotor whereby the exciter ring is retained during a thermal expansion event of the rotor and not pushed toward a sensor.

DETAILED DESCRIPTION

In the description that follows, components of the disc brake in the various embodiments that are identical may be identified by a same number or the same number plus whenever necessary to better describe a functional relationship with another component.

Figure 1:
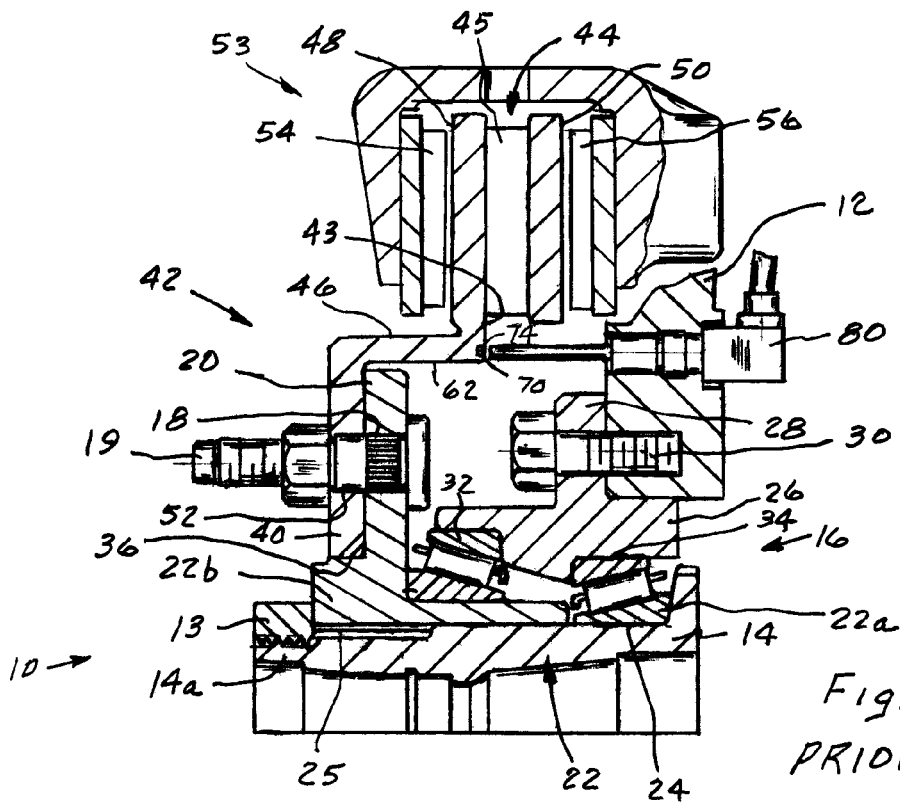
FIG. 1 is a sectional view of a rotor and exciter ring of the prior art for use in a brake system.

The present invention is designed to be incorporated in a corner assembly 10 and may be of a type such as disclosed in U.S. Pat. No. 5,984,422 or 6,718,634, wherein a hub 14 and bearing 16 are retained in a knuckle 12 as illustrated in FIG. 1. The bearing 16 includes an inner race 22 with a flange 20 that has a plurality of openings 18 (only one is shown) for receiving a corresponding plurality of studs 19 through which a rotor 42 and ultimately a rim of a wheel are attached to an axle of the vehicle. The inner race 22 of bearing 16 is located on a mounting surface 24 of the hub 14 and separated from an outer race 26 by a plurality of rollers 32,34 (only two are shown) that are located between the inner race 22 and outer race 26 in a radial arc around the axial of the hub 14. The outer race 26 has a plurality of ears 28, only one of which is shown, with an openings therein through which bolts 30 fix the outer race 26 to the knuckle 12. A first portion 22a of the inner race 22 of bearing 34 is initially positioned on mounting surface 24 on hub 14 and a second portion 22b of bearing 32 is later positioned on the mounting surface 24. The second portion 22b has splines 25 thereon that are mated with corresponding splines on the hub 14 such that the second portion 22b and hub 14 function as a unit. A nut 13 is attached to the end 14a of the hub 14 to engage the second portion 22b of the inner race 22 and move the second portion 22b toward the first portion 22a to align the bearings 32,34 between the inner 22 and outer race 26 and affix the hub 14 to the knuckle 12. When the hub 14 is attached to the knuckle 12, the flange 20 on the inner race 22 is located in a plane that is perpendicular to the axis of hub 14 such that an annular surface 36 is concentric to the axis of the hub 14 on the inner race 22 and provides a guide for receiving a mounting flange 40 of a rotor 42.

The rotor 42 that includes a radial disc 44 that is offset from the mounting flange 40 by a cylindrical body 46. The radial disc 44 has a first surface 48 that functions as a first friction face and a second surface 50 that function as a second friction face. The radial disc 44 has a plurality of passages 45 (only one is shown) therein that provide a flow path for the circulation of air to cool the radial disc 44. The mounting flange 40 includes a corresponding plurality of openings 52 that are matched with the openings 18 in flange 20. For some vehicles, bolts or studs 19 extend for the mounting of the rim of a wheel of the corner assembly 10 while in larger applications for trucks separate bolts or studs (not shown) are used to attach a rim to the flange 20. The mounting flange 40 engages flange 20 such that the radial disc 44 is aligned in a perpendicular relationship with the hub 14 and the first 48 and second 50 radial surfaces are positioned in a caliper 53 with first 54 and second 56 friction members being respectively located adjacent first 48 and second 50 surfaces. Once bearing 16 is secured to the hub, the radial disc 44 is maintained in the same perpendicular radial alignment with respect to the hub 14 such that surfaces 48 and 50 are located in parallel planes with respect to the caliper.

An exciter ring 60 of a type disclosed in U.S. Pat. No. 5,332,065 is integrally molded into the cylindrical body 46 and located on face 43. The exciter ring 60 is defined by a plurality of teeth 74, only one is shown, that are located in axial alignment with a sensor 80 retained on knuckle 80. The teeth 74 are of a different material than the cylindrical body 46 and as a result produce a different reluctance signal when sensed by sensor 80 that is retained on knuckle 12. The signal as measured or detected by sensor 80 may be either a magnetic signal or an optical signal as the sensor 80 detects changes in the reluctance between a solid section and an open section or between different materials on surface 43 to create a signal that provides information that is supplied to an electronic control unit (ECU)(not shown) from which information is derived relating to the rotation of the rotor 42.

Figure 2:
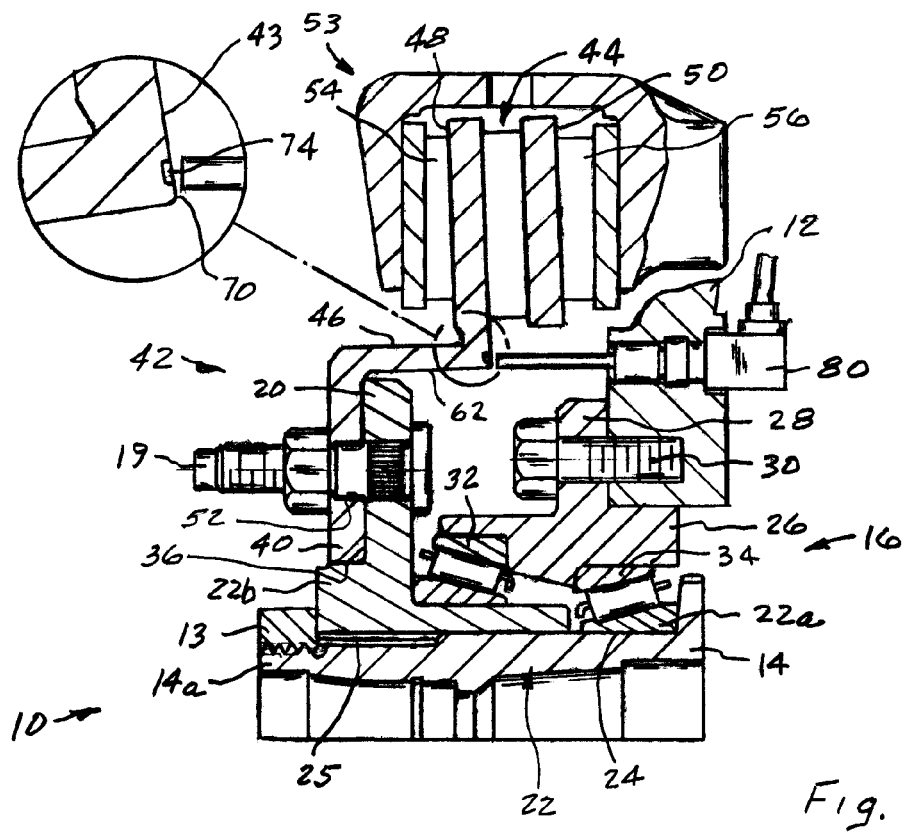
FIG. 2 is a sectional view of the rotor and exciter ring of FIG. 1 with an enlarged view illustrating a relationship that may occur between the rotor and a sensor when thermal energy generated during a brake application causes deflection of the rotor.
Figure 3:
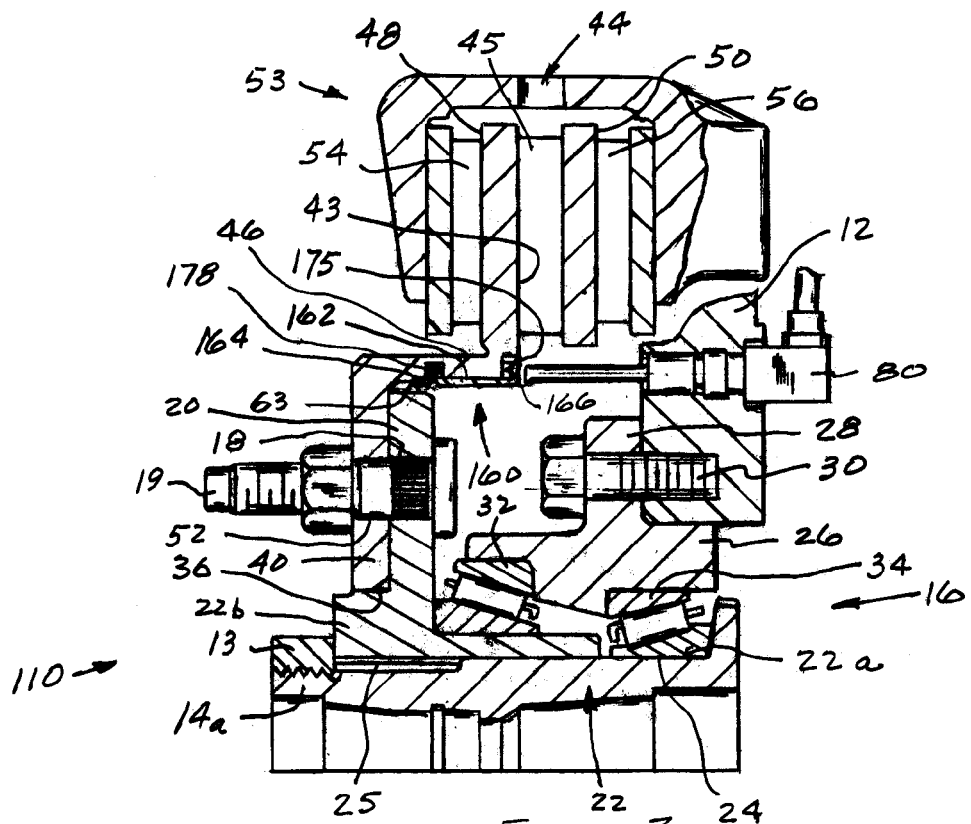
FIG. 3 is a sectional view of a rotor with an exciter ring made according to the present invention for use in a brake system.

When an operator desires to effect a brake application, the first and second friction member are brought into corresponding engagement with surfaces 48 and 50 to attenuate the rotation of the radial disc 44. The signal received from sensor 80 provides the ECU with information relating to a change in rotation of the radial disc 44 and coordinates the braking in accordance with the braking desires of the operator and safe operation of the vehicle. During a brake application, on engagement of the first and second friction members with surfaces 48 and 50, thermal energy is created that may effect the effectiveness of the friction members. The passages 45 provide a flow path for air to cool the radial disc 44 but under certain conditions such as a rapid sequential engagement of the friction members with surfaces 48 and 50 the generated thermal energy is such that the volume of air flowing through passages 45 is not sufficient to cool the rotor and as a result the rotor 42 may expand both axially and radially and as result the radial disc 44 may change from a perpendicular, illustrated in FIG. 1, to a non-perpendicular alignment, illustrated in FIG. 2. It has been determined that a transfer of heat generated during such a brake event occurs in a direction from the radial disc 44 toward the mounting flange 40 with expansion changes following in a correspond manner from the radial disc 44 toward the mounting flange 40 with expansive changes being essentially negligible in the flange 40 but significant thermal expansion may occur in the radial disc 44 and in particular at end 70 of cylindrical body 46 and along face 43. Unfortunately a reluctance signal detected by sensor 80 from movement of openings 74 or the sequential different materials or surface configuration on face 43 may be effected by such thermal expansion and as a result the information developed by the ECU relating to the rotation of rotor 42 may correspondingly be skewed from what actually is occurring at any particular interval of time. It has been suggested that deflection in the radial disc 44 could be reduced with an increase in the thickness of the cylindrical body 46 but such an increase would also result in an increase in the weight of the rotor and most vehicle manufacturers would regard this as a unacceptable solution correct a functional change in the manner information is obtained relating to the operation of the vehicle.

The present invention as illustrated by the various embodiments in FIGS. 3–10 was developed for use in a corner assembly 110 to obtain information relating to the operation of a vehicle and provide an assurance that the information obtained by sensor 80 is not affected by changes in a perpendicular alignment of the radial disc 44 of a rotor 42 caused by thermal expansion of the rotor 42 resulting from the development of thermal energy during braking of a vehicle.

In more particular detail, the relationship between the radial disc 44 and in particular the cylindrical body 46 and an exciter ring 160 for the corner assembly 110 is such that the rotor 42 may independently more from a perpendicular to a non-perpendicular alignment with respect to hub 14 while the exciter ring 160 remains in axial alignment with sensor 80.

The exciter ring 160 is defined by a cylindrical member 162 having a first end 164 and a second end 166. The second end 166 has an outwardly extending radial flange 168 with an axial lip 170 thereon, see FIGS. 5 and 6. The flange 168 has a plurality of radial slots 172,172" . . . 172", that extend from an inner peripheral surface 174 on the cylindrical member 162 toward the axial lip 170. The first end 164 of the exciter ring 160 is pushed into peripheral surface 62 on cylindrical body 46 of rotor 42 until either end 164 engages a shoulder 63 or lip 170 engages shoulder 65 on face 43 to define a gap 175 between face 177 on flange 168 and shoulder 65. The cylindrical member 162 may be resiliently retained in peripheral surface 62 but is desirable to retain the cylindrical member 162 to cylindrical body 46 by a fastener defined by a screw or pin 178 that is inserted through the cylindrical member 162 into the cylindrical body 46 to assist in locating the exciter ring 160 on the cylindrical body 46. Flange 168 has a plurality of radial slots 172,172" . . . 172" that extending from the inner peripheral surface 174 of the cylindrical member 162 toward the lip 170 such that gap 175 is opened to the environment and as a result moisture that could contribute to the development of oxidation of the rotor 42 is not retained by the exciter ring 160 or debris (friction dust) developed during braking is not retained in a manner that would accumulate in a slot and effect the reluctance signal sensed by sensor 80.

Figure 4:
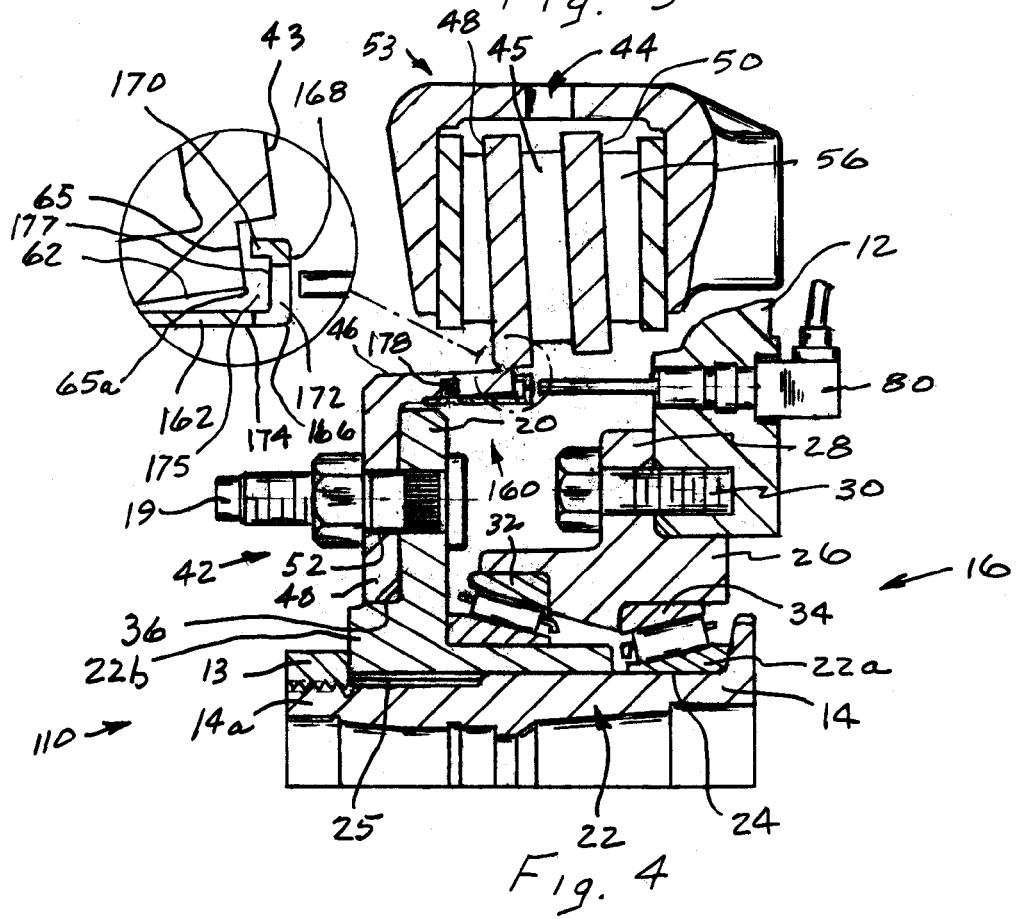
FIG. 4 is a sectional view showing a relationship between the exciter ring of FIG. 3 and the rotor when high thermal energy generated during a brake application causes the rotor to move from a perpendicular to a non-perpendicular alignment with respect to a hub.
Figure 5:
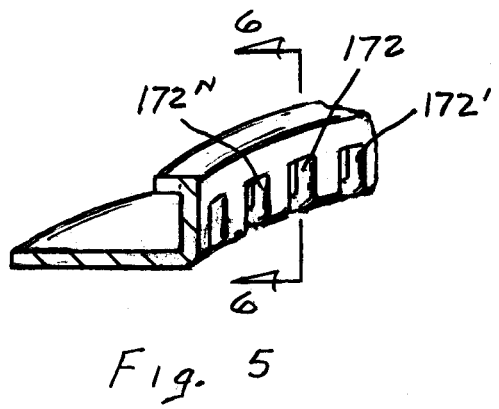
FIG. 5 is a perspective view of the rotor ring of FIG. 3.
Figure 6:
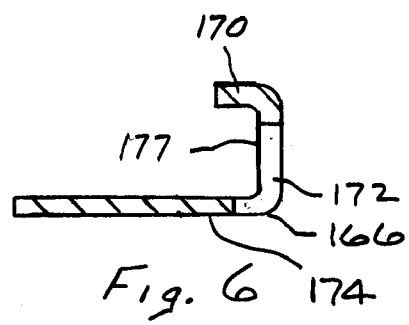
FIG. 6 is a sectional view taken along lines 6—6 of FIG. 5.
Figure 8:
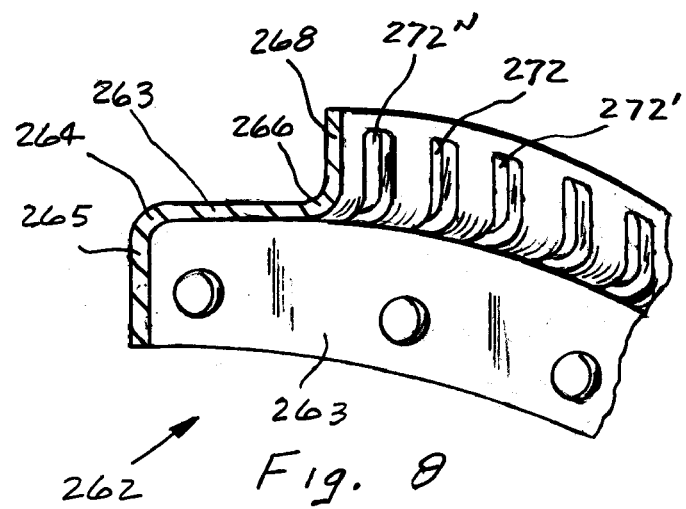
FIG. 8 is a perspective view of the exciter ring of FIG. 7.

A corner assembly 110 that includes an exciter ring 160 functions in a same manner as the prior art during normal braking activities but now when a predetermined thermal energy level occurs during a braking sequence and the radial disc 44 of rotor 42 is drawn from a perpendicular to a non-perpendicular alignment, as illustrated in FIG. 4, due to the coefficient of expansions of the rotor 42 as the thermal energy is conducted from the radial disc 44 toward the mounting flange 40 by way of the cylindrical body 46, the exciter ring 160 remains in axial alignment with sensor 80. The gap 175 allows corner 65a on face 43 of the radial disc 44 to pivot about the mounting flange 40 without engaging radial flange 168. Thus, information obtained by sensor 80 and provided to an ECU would not be effected by changes in the radial alignment of the radial disc 44.

Figure 7:
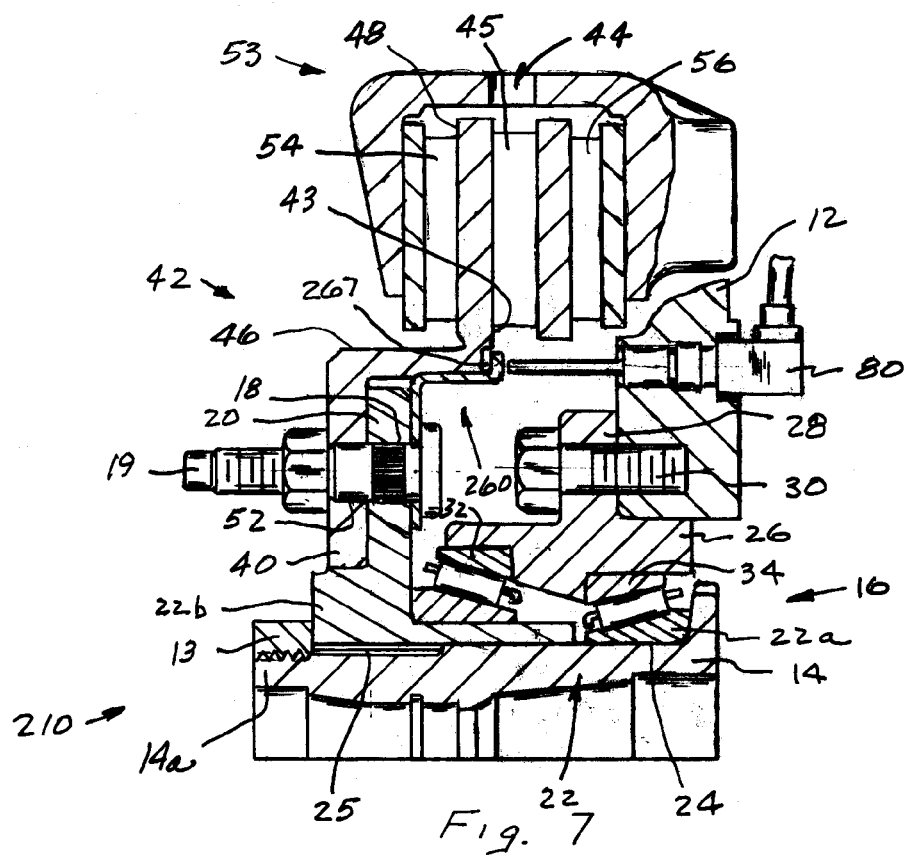
FIG. 7 is a sectional view of a rotor and a first exciter ring that are attached to a hub of a vehicle through a fastener system.
Figure 9:
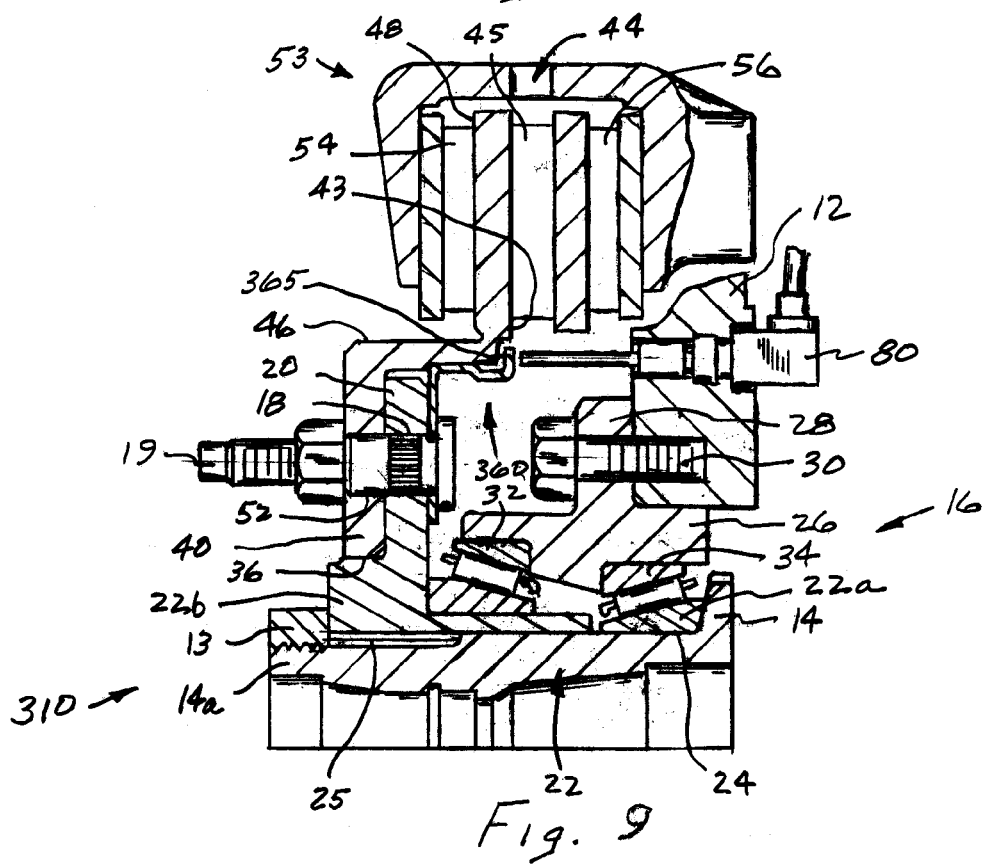
FIG. 9 is a sectional view of a rotor and second exciter ring for that are attached to a hub of a vehicle through the fastener system of FIG. 7.

For some applications it may be desirable to directly attach an exciter ring to the flange 20 of hub 14 in a corner assembly 210. Exciter ring 260 illustrates such a modification of the invention that may be achieved by combining several arcuate segments 262 illustrated in FIG. 8 to define a ring. The arcuate segments 262 are attached to the flange 20 of the hub 14 by studs 19 as illustrated in FIG. 7. Each segment of the arcuate segments 262 is defined by a cylindrical member 263 with a first end 264 having an inwardly extending flange 265 and a second end 266 having an outwardly extending flange 268. The width of the cylindrical member 263 is selected to be greater than the width of the offset of the cylindrical body 46 such that when flange 265 abuts mounting flange 40 of rotor 42 and is located between flange 20 on hub 14 a gap 275 is created between the outwardly extending flange 268 and corner 65a on face 43 of radial disc 44 for rotor 42. This exciter ring 260 functions in a same manner as exciter ring 160 such that when the radial disc 44 deviates from a perpendicular alignment with hub 14, the exciter ring 260 remains in axial alignment with sensor 80 and the reluctance information gained from the movement of the radial slots 272,272" . . . 272" with respect to the sensor 80 and provided to the ECU is not skewed in a manner to effect a brake application.

Figure 10:
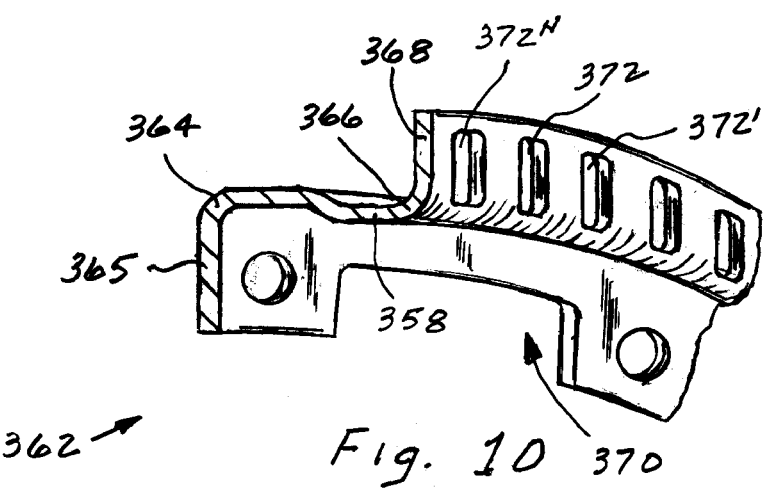
FIG. 10 is a perspective view of the exciter ring of FIG. 9.

In order to reduce the weight of an exciter ring it was decided that an exciter ring may not need to be attached to the flange 20 of hub 14 by each stud and as a result an exciter ring 360 was developed for a corner assembly 310 as illustrated in FIG. 10. The exciter ring 360 is defined by a plurality of segments 362 each of which is defined by a cylindrical member 363 with a first end 364 having an inwardly extending flange 365 and a second end 366 having an outwardly extending flange 368. The inwardly extending flange 365 has a plurality of ears 372,372' to define a slot 370 between the mounting holes 376,376' though which the mounting studs 19 extend while the width of the cylindrical member 363 is selected to be greater than the width of the offset of the cylindrical body 46 such that when flange 365 abuts mounting flange 40 of rotor 42 and is located between flange 20 on hub 14 a gap 375 is created between the outwardly extending flange 368 and corner 65a on face 43 of radial disc 44 for rotor 42, see FIG. 9. In addition, the cylindrical member 363 includes an offset 358 such that the gap 375 extends a distance along the peripheral surface 62 of cylindrical body 46 such that thermal energy is not conducted into the exciter ring 360 in a manner that would effect a change in the axial alignment with sensor 80. This exciter ring 360 functions in a same manner as exciter ring 260 such that when the radial disc 44 deviates from a perpendicular alignment with hub 14, the exciter ring 360 remains in axial alignment with sensor 80 and the reluctance information gained from the movement of the radial slots 372,372" . . . 372" with respect to the sensor 80 and provided to the ECU is not skewed in a manner to effect a brake application.

I claim:

1. A rotor assembly that is mounted on a hub which is retained on an axle of a vehicle, said rotor assembly includes a radial disc and an exciter ring through which a sensor detects the rotation of the radial disc with respect to the axle, said a radial disc that is offset from a mounting flange fixed to said hub by a cylindrical body and has a first surface that functions as a first friction face and a second surface that function as a second friction face when respectively engaged by first and second friction members to attenuate the rotation of said radial disc during a brake application, said first and second friction members on engagement with said first and second friction faces generating thermal energy that is carried from said radial disc through said cylindrical body and into said mounting flange, said radial disc reacting to a predetermined thermal energy level by moving out of a perpendicular alignment with said hub, said exciter ring being characterized by a cylindrical member having a first end and a second end with a sensor flange thereon, said first end being concentrically retained in said cylindrical body of said rotor such that an axial lip on said sensor flange engages said radial disc to define a gap between said sensor flange and said radial disc, said sensor flange having a plurality of first and second reluctance sections located thereon that are aligned with said sensor to provide a signal corresponding to the rotation of said rotor, said gap allowing said radial disc to move independently of said sensor flange such that said plurality of first and second reluctance sections remain aligned with said sensor with changes in the perpendicular alignment of the radial disc and said hub and said signal remains as an accurate indication of rotation.

2. The rotor assembly as recited in claim 1 wherein said plurality of first and second reluctance sections is defined by radial slots in said sensor flange through which said signal generated corresponds to the rotation of the said rotor.

3. The rotor assembly as recited in claim 2 wherein said radial slots extend from an inner peripheral face on said cylindrical member toward said lip on said sensor flange.

4. The rotor assembly as recited in claim 3 wherein said radial slots define passages that allow any moisture present in said gap to be expelled into the environment and thereby reduce the possibility of oxidation of the exciter ring.

5. The rotor assembly as recited in claim 2 wherein said radial slots define passages that would reduce the possibility of any friction dust developed during a brake application from accumulating and being retained in said gap.

6. The rotor assembly as recited in claim 3 wherein said cylindrical member is secured to said cylindrical body of said rotor by a plurality of fasteners that extend through said cylindrical member adjacent said first end and into said cylindrical body.

7. The rotor assembly as recited in claim 5 wherein said mounting flange is fixed to said hub through a second plurality of fasteners to initially establish said perpendicular alignment between said radial disc and said hub.

8. A rotor assembly mounted on a hub that is retained on an axle of a vehicle, said rotor assembly including a radial disc that is offset from a mounting flange that is fixed to said hub by a cylindrical body and an exciter ring through which a sensor detects rotation of the radial disc with respect to the axle, said radial disc having a first surface that functions as a first friction face and a second surface that function as a second friction face that are respectively engaged by first and second friction members to attenuate the rotation of said radial disc, said first and second friction members on engagement with said first and second friction faces generating thermal energy that is carried from said radial disc toward said mounting flange through said cylindrical body, said radial disc reacting to a predetermined thermal energy level by being distorted from perpendicular alignment to non-perpendicular alignment with respect to said hub, said exciter ring being characterized by a cylindrical member having a first end that is concentrically aligned within said cylindrical body of said rotor assembly to define a gap between a face on an outwardly extending flange on a second end thereof and said radial disc, said outwardly extending flange having a plurality of reluctance sections located thereon that are aligned with said sensor through which said sensor obtains information relating to the rotation of said radial disc, said gap allowing said radial disc to move independently with respect to said outwardly extending flange such that said plurality of reluctance sections remain aligned with said sensor whenever said radial disc changes from perpendicular to non-perpendicular alignment with respect to said hub.

9. The rotor assembly as recited in claim 8 wherein said first end of said cylindrical member is further characterized by an inwardly extending flange, said inwardly extending flange being fixed to said hub by a plurality of fastener members.

10. The rotor assembly as recited in claim 9 wherein said length of said cylindrical member with respect to said cylindrical body defines a width of said gap, said gap being of such width that said radial disc may move without touching said outwardly extending flange.

11. The rotor assembly as recited in claim 10 wherein said first and second reluctance sections are defined by a plurality of radial slots in said radial flange, said radial slots extending from a peripheral face on said cylindrical member toward a peripheral face on said flange such that any moisture in said gap may be expelled into the surrounding environment to reduce the possibility of oxidization forming on said exciter ring that could effect the sensor signal.

12. The rotor assembly as recited in claim 11 wherein said first end of said cylindrical member is further characterized by being resiliently retained against a stop within said cylindrical body to define a space relationship between said outwardly extending flange and said radial disc to establish said gap.

13. The rotor assembly as recited in claim 8 further including fastener means through which said cylindrical member is retained within said cylindrical body.

14. The rotor assembly as recited in claim 13 wherein said first and second reluctance sections are defined by a plurality of radial slots in said radial flange, said radial slots extending from a peripheral face on said cylindrical member toward a peripheral face on said flange such that any moisture or dust is not retained in said gap but expelled into the surrounding environment to reduce the possibility of retension that may effect the sensor signal.

* * * * *